(12) United States Patent
Oh

(10) Patent No.: US 7,546,202 B2
(45) Date of Patent: Jun. 9, 2009

(54) NAVIGATION APPARATUS AND METHOD FOR SEARCHING FOR POINT OF INTEREST USING THE SAME

(75) Inventor: Jun-Suk Oh, Gyeonggi-Do (KR)

(73) Assignee: LG Electroncis Inc., Seoul (KR)

( * ) Notice: Subject to any disclaimer, the term of this patent is extended or adjusted under 35 U.S.C. 154(b) by 551 days.

(21) Appl. No.: 11/365,923

(22) Filed: Mar. 2, 2006

(65) Prior Publication Data
US 2006/0200304 A1 Sep. 7, 2006

(30) Foreign Application Priority Data
Mar. 4, 2005 (KR) .................. 10-2005-0017972

(51) Int. Cl.
G08G 1/0969 (2006.01)
G01C 21/34 (2006.01)
G06F 19/00 (2006.01)

(52) U.S. Cl. .................. 701/200; 701/201; 701/210; 340/995.19

(58) Field of Classification Search ............... 701/200, 701/209, 201, 211, 210, 207; 340/995.19, 340/995.23, 995.24
See application file for complete search history.

(56) References Cited

U.S. PATENT DOCUMENTS

| | | | |
|---|---|---|---|
| 5,802,492 A | 9/1998 | DeLorme et al. | |
| 6,401,034 B1 * | 6/2002 | Kaplan et al. | 701/209 |
| 6,542,814 B2 * | 4/2003 | Polidi et al. | 701/208 |
| 2003/0167120 A1 * | 9/2003 | Kawasaki | 701/209 |
| 2003/0191578 A1 * | 10/2003 | Paulauskas et al. | 701/200 |
| 2004/0260464 A1 * | 12/2004 | Wong | 701/209 |
| 2004/0260465 A1 * | 12/2004 | Tu | 701/209 |
| 2006/0089788 A1 * | 4/2006 | Laverty | 701/202 |

OTHER PUBLICATIONS

European Search Report, Application Serial No. 06290356.2, dated Jul. 5, 2006, 12 pages.

* cited by examiner

*Primary Examiner*—Tan Q Nguyen
(74) *Attorney, Agent, or Firm*—Fish & Richardson P.C.

(57) ABSTRACT

Searching for a Point of Interest (POI) in a navigation apparatus includes accessing a preset driving route that includes a group of route points. A POI is associated with each route point in the group. The associated POIs are stored in a first storing unit. A current position of a moving object is determined. After storing the associated POIs, a current route point corresponding to the current position of the moving object is selected from among the group of route points. The POI associated with the current route point is accessed from storage, and information associated with the POI associated with the current route point is accessed from storage and outputted.

28 Claims, 4 Drawing Sheets

NAVIGATION APPARATUS AND METHOD FOR SEARCHING FOR POINT OF INTEREST USING THE SAME

BACKGROUND

1. Field

This document relates to searching for points of interest along a driving route.

2. Background of the Related Art

A navigation apparatus typically performs the following functions: (1) determines an optimal driving route from a start point to a destination point based on a map database; (2) detects a current position of a moving object using a Global Positioning System (GPS) signal received from a GPS system and a moving object detection signal generated by a sensor on the moving object (e.g., a gyro sensor and a velocity sensor); (3) maps the detected current position of the moving object to a route point extracted from the map database; and (4) displays the mapped result. The navigation apparatus also typically provides driving guidance information to a driver by displaying and/or speaking the information to the driver that enables the driver to follow the optimal driving route. The navigation apparatus may be mounted on various moving objects, including ships, aircrafts, and the like.

The navigation apparatus also may be programmed to search for Points Of Interest (POIs) around the current position of the moving object. That is, when a user initiates a POI search by providing the navigation apparatus with a search term, the navigation apparatus may provide a preset number of search results corresponding to POIs within a preset distance from the current position of the moving object.

Figure 1:
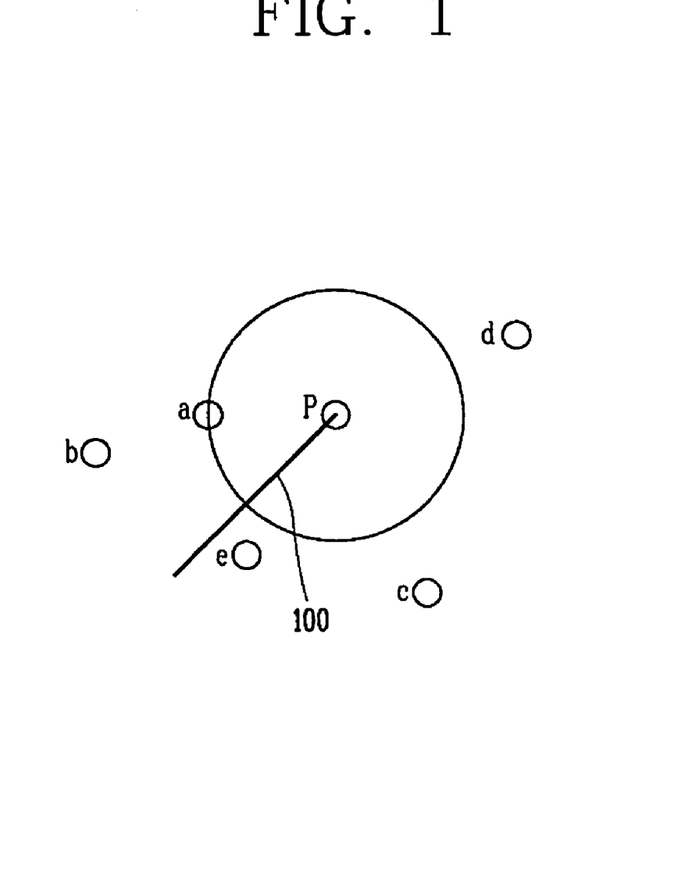
FIG. 1 illustrates a method for searching for a POI using a conventional navigation apparatus.

FIG. 1 illustrates a method for searching for POIs using a conventional navigation apparatus.

As illustrated in FIG. 1, a straight line 100 denotes a road over which the moving object travels. A point P denotes a current position of the moving object, and points (a, b, c, d and e) denote POIs within a preset distance from the point P. The POIs were identified by the conventional navigation apparatus in response to a search request submitted by a user. The search request typically includes one or more search terms inputted by the user.

The method used by the conventional navigation apparatus for searching for the POIs is relatively inflexible. For example, if the current position of the moving object is changed from the point P to another point (not shown), the previously-detected points (a, b, c, d and e) may no longer be relevant to the user, as they may have moved so far away from the moving object that they are no longer of interest to the user. Yet, to obtain POIs close enough to the moving object to be of interest, the user must re-input the one or more search terms and the navigation apparatus must re-perform the POI search.

In particular, when the user wishes to go to the nearest POI to his current position, the conventional navigation apparatus may identify point (a) as the nearest POI based on the point P, the current position of the moving object when the user requested the POI search. However, as the moving object moves away from point P, point (a) may no longer be the nearest POI to the moving object. Rather, point (e) or point (b) may become the nearest POI. Moreover, if the moving object moves even farther away from point P, none of the identified points (a)-(d) may be the nearest POI to the moving object. Rather, another as yet unidentified POI may become the nearest POI to the moving object.

In sum, when searching for POIs using a conventional navigation apparatus, the results of the POI search depend on the current position of the moving object, and accordingly, the POI search is repeated whenever the moving object changes its current position.

SUMMARY

A navigation apparatus may provide in real time a Point Of Interest (POI) associated with points on a preset driving route over which a moving object travels without re-performing the POI search each time the current position of the moving object changes.

The navigation apparatus includes a control unit and an output unit. The control unit is configured to: (1) access a preset driving route including a group of route points; (2) for each route point in the group, identify one or more POIs associated with the route point, (3) store the identified POIs in a data store; (4) determine a current position of the moving object based on position information; (5) select a current route point that corresponds to the current position from among the group of route points; and (6) access the stored POI(s) identified for the current route point and any associated information. The output unit is configured to output in real time the accessed information for the POI(s) previously identified as being associated with the route point that corresponds to the current position of the moving object.

Details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 2:
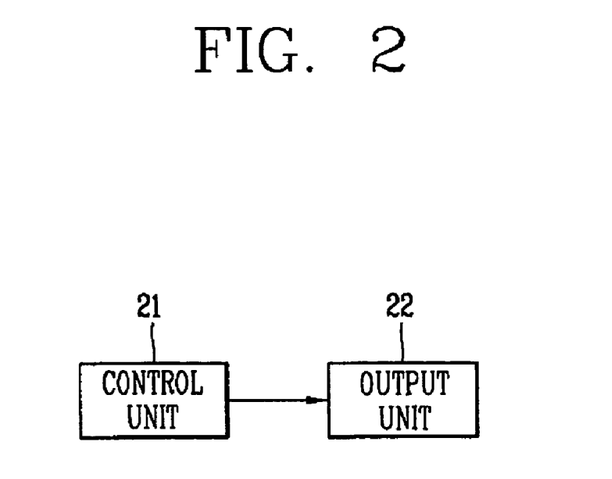
FIG. 2 illustrates a navigation apparatus.

FIG. 2 shows a navigation apparatus that includes a control unit 21 and an output unit 22. The control unit 21 is configured to previously associate each route point on a preset driving route with each Point of Interest (POI) adjacent to the preset driving route among previously searched POIs. The control unit 21 is also configured to determine a current position of a moving object on the basis of position information of the moving object. The output unit 22 is under the control of the control unit 21 and is configured to output, in real time, information for a POI pre-associated with the route point associated with the determined current position of the moving object.

The control unit 21 is configured to control the overall operation of the navigation apparatus as follows. First, the control unit 21 presets a driving route on the basis of, among other criteria, a starting point and a destination point inputted or otherwise provided by a user. The start point or the destination point of the preset route may be determined based on the current position of the moving object. The control unit 21 typically determines the current position of a moving object from position information of the moving object such as, for example, information included in a GPS reception signal and in a self sensor signal (i.e., a movement related signal generated by the moving object itself, such as a signal generated from a velocity sensor or a gyro sensor in the moving object).

The control unit 21 is also configured to search for POIs that match or otherwise satisfy a search request submitted by a user. The user typically submits the search request by inputting or providing one or more search terms or words to the control unit 21. For example, the user may input or provide the terms "gas stations" to the control unit 21, thereby indicating the user's interest in identifying the locations of nearby gas stations. The control unit 21 selects POIs that satisfy the submitted search and that are also within a predetermined distance adjacent to the preset driving route.

The control unit 21 associates each route point on the preset driving route with the selected POIs. For instance, the control unit 21 associates each route point with one of the selected POIs according to a distance association. For example, the control unit 21 may associate each route point with a selected POI that is nearest to that route point.

To identify the POIs nearest to the route points on the preset driving route, the control unit 21 determines boundary points on the preset driving route. The boundary points are points on the preset driving route at which the nearest POI to the route point(s) on the driving route prior to the boundary point is different than the nearest POI to the route point(s) subsequent to the boundary point. To determine the boundary points, the control unit 21 sequentially and hierarchically divides the preset driving route on the basis of the POIs nearest to the destination point and the start point, respectively. Once the boundary points have been identified, the rest of the route points on the preset driving route may be matched with their corresponding nearest POIs. The process used by the control unit 21 to determine boundary points is described in detail below with reference to FIGS. 3A to 3D. The control unit 21 may store the identified POIs in a data store (e.g., storing unit 42).

As the moving object moves along the preset driving route, the control unit 21 may be configured to identify the route point(s) on the preset driving route corresponding to the current position of the moving object based on the position information and location information retrieved from a map database (not shown). Under the control of the control unit 21, the output unit 22 is configured to output real time information associated with the POI that has been previously identified by the control unit 21 as being nearest to the route point corresponding to the determined current position of the moving object (i.e., the POI has been "pre-associated" with the route point). Information for the POI pre-associated with the route point may be outputted, for example, as an image or text in the display of the navigation apparatus or as voices, or any combination thereof. The information may include, for example, distance information from the route point to the pre-associated POI.

Notably, the POIs associated with the preset driving route may change at each boundary point. Accordingly, the output unit 22 also may be configured to output, in real time, information related to the change in the POI at each boundary point, merely by reference to a previously determined and stored POI corresponding to the preset location. The output unit 22 may be configured to output the information related to the changes in the POIs as voices, texts, images, or combinations therewith.

If a user designates or otherwise selects one POI from among the POIs searched or identified around the preset driving route, the output unit 22, under the control of the control unit 21, may be configured to output information related to the selected POI regardless of whether that selected POI is the POI nearest to the route point that is associated with the current position of the moving object. In this case, the output unit 22, under the control of the control unit 21, may be additionally configured to output information to guide the user from the current position of the moving object to the designated POI.

FIGS. 3A to 3D illustrate a process in which the control unit 21 calculates each boundary point on the preset driving route. The POIs identified by the control unit 21 may correspond, for example, to banks nearest to the preset driving route.

Figure 3A:
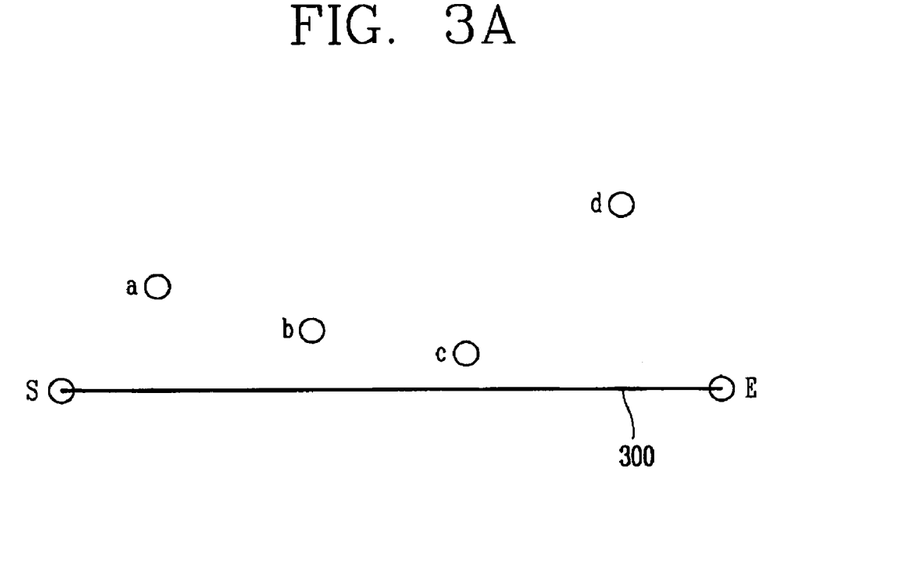
FIGS. 3A to 3D illustrate a process for calculating a boundary point using the navigation apparatus.

FIG. 3A shows the preset driving route 300 as starting at a start point S and ending at a destination point E. The POIs nearest to the preset driving route are designated by points (a, b, c and d).

Typically, the user inputs the start point S and the destination point E in the navigation apparatus to designate or preset the driving route. The start point may be, for example, the current position of the moving object, which may be determined by the navigation apparatus based on position information. The user also may submit a search request to the navigation apparatus by, for example, inputting a search word or term such as, for example, 'bank.' The control unit 21 receives the search request and processes the search request to identify the POIs nearest or otherwise within a predetermined distance from the preset driving route. In this example, four banks are identified as being nearest to the preset driving route and are designated by points (a, b, c and d).

Figure 3B:
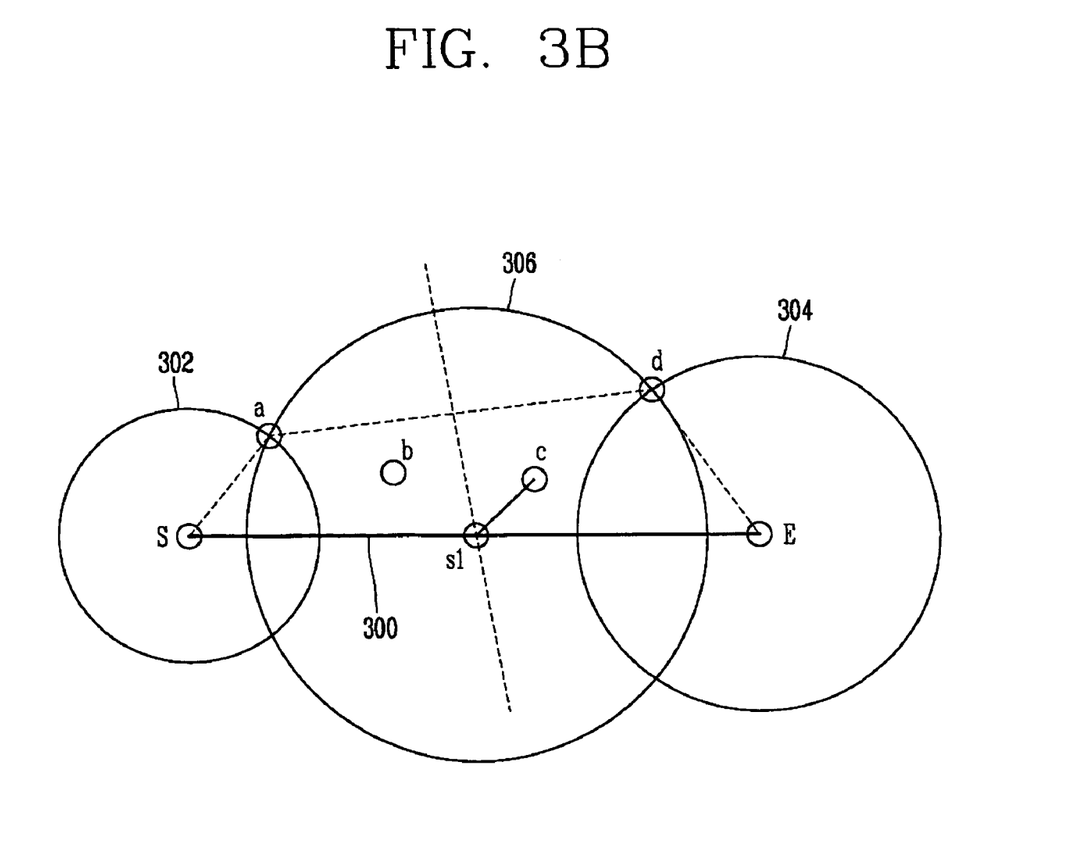
Figure 3C:
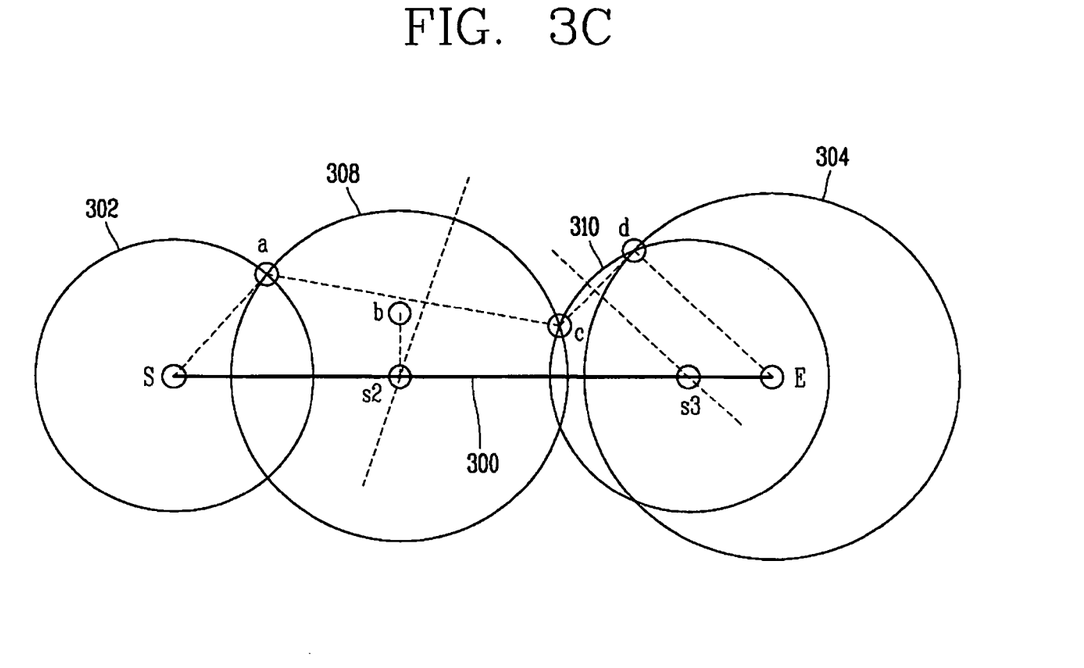
Figure 3D:
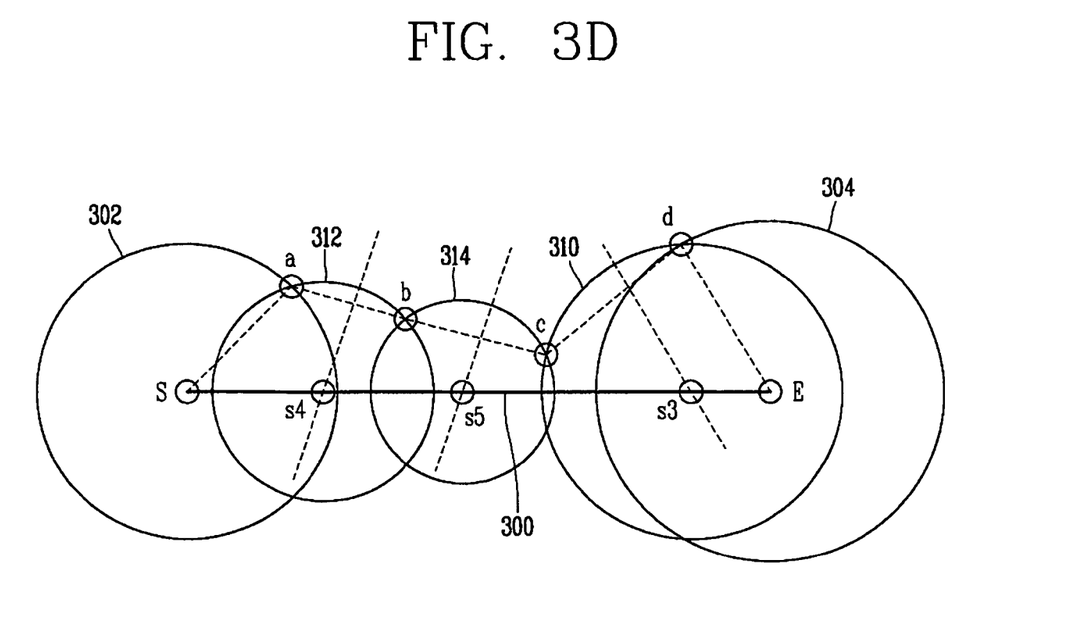

FIGS. 3B-3D are illustrations visually depicting the geometric calculations performed by the control unit 21 to identify the boundary points on the preset driving route. For clarity of exposition, the following description refers to the control unit 21 as "drawing" lines and circles. The "drawing" of lines and circles, however, should be interpreted merely as performing geometric calculations and may not include actually drawing a line or a circle for display. FIGS. 3B-3D visually show the circles "drawn" by the control unit 21 to identify the boundary points on the preset driving route starting at point S and ending at destination E.

Referring to FIG. 3B, the control unit 21 draws a circle 302 having a radius corresponding to a straight line which connects the start point S with the first bank (a) nearest thereto. The control unit 21 also draws a circle 304 having a radius corresponding to a straight line which connects the destination point E with the fourth bank (d) nearest thereto.

Next, the control unit 21 connects the first bank (a) to the fourth bank (d) with a straight line (not shown), draws a straight line orthogonal to the straight line between the first bank (a) and the fourth bank (d) from a middle point of the straight line (not shown), and identifies a temporary point S1 as the point of intersection between the orthogonal straight line and the preset driving route 300. As can be seen in FIG. 3B, a distance between the temporary point S1 and the first bank (a) is the same as a distance between the temporary point S1 and the fourth bank (d).

The control unit 21 draws a circle 306 centered on the temporary point S1. As shown in FIG. 3B, the first and fourth banks (a and d) are positioned on a circumference of the circle 306, and the second and third banks (b and c) are positioned inside the circle 306. The control unit 21 selects the third bank (c), which is the bank nearest to the temporary point S1, from among the banks (b and c) inside the circle 306 as a seed point, and deletes the temporary point S1.

Referring to FIG. 3C, the control unit 21 draws straight lines (not shown) from the seed point (i.e., the third bank (c)) to the first bank (a), which is the bank nearest to the start point S, and from the third bank (c) to the fourth bank (d), which is the bank nearest to the destination point E. Next, the control unit 21 draws a straight line orthogonal to the straight line between the first bank (a) and the third bank (c) from a middle point thereof, and determines a point at which the orthogonal straight line meets the preset driving route 300 as a temporary point S2. Similarly, the control unit 21 draws a straight line orthogonal to the straight line between the third bank (c) and the fourth bank (d) from a middle point thereof, and determines a point at which the orthogonal straight line meets the driving route as a temporary point S3. Accordingly, a distance between the temporary point S2 and the first bank (a) is the same as a distance between the temporary point S2 and the third bank (c). Similarly, a distance between the temporary point S3 and the third bank (c) is the same as a distance between the temporary point S3 and the fourth bank (d).

The control unit 21 draws a circle 308 centered on the temporary point S2, and draws a circle 310 centered on the temporary point S3. As shown in FIG. 3C, the first and third banks (a and c) are positioned on a circumference of the circle 308, and the third and fourth banks (c and d) are positioned on a circumference of the circle 310. FIG. 3C also shows that the circle 308 centered on the temporary point S3 does not include any bank therein. The temporary point S3 is confirmed as a boundary point S3 because no banks are positioned within its associated circle 308.

The circle 310 centered on the temporary point S2, however, includes the second bank (b) therein, and, therefore, S2 does not correspond to a boundary point. The control unit 21 designates the second bank (b) as a seed point and deletes the temporary point S2.

As shown in FIG. 3D, the control unit 21 draws a straight line between the second bank (b) and the first bank (a) (not shown), and draws a straight line between the second bank (b) and the third bank (c) (not shown). Next, the control unit 21 draws a straight line orthogonal to the straight line between the second bank (c) and the first bank (a) from a middle point thereof (not shown). The control unit 21 designates a point at which the orthogonal straight line meets the driving route as a temporary point S4. Accordingly, a distance between the temporary point S4 and the first bank (a) is the same as a distance between the temporary point S4 and the second bank (b).

Similarly, the control unit 21 draws a straight line orthogonal to the straight line between the second bank (b) and the third bank (c) from a middle point thereof (not shown). The control unit 21 designates a point at which the orthogonal straight line meets the driving route as a temporary point S5. Accordingly, a distance between the temporary point S5 and the second bank (b) is the same as a distance between the temporary point S5 and the third bank (c).

The control unit 21 draws a circle 312 centered on the temporary point S4 and draws a circle 314 centered on the temporary point S5. As shown in FIG. 3D, the first and the second banks (a and b) are positioned on a circumference of the circle 312, and the second and third banks (b and c) are positioned on a circumference of the circle 314. FIG. 3D also shows that the circles centered on the temporary points S4 and S5, respectively, do not include any bank therein. Therefore, the temporary points S4 and S5 are confirmed as the boundary points S4 and S5.

As shown in FIG. 3D, the circles 302, 312, 314, 310 and 304 centered around the points S, S4, S5, S3 and E, respectively, on the preset driving route 300 do not include any bank therein. Accordingly, the points S, S4, S5, S3 and E correspond to the boundary points of the preset driving route 300. The control unit 21 may use the identified boundary points to associate each route point on the preset driving route with a bank that is nearest thereto. Specifically, each route point within each route section (S-S4, S4-S5, S5-S3 and S3-E) is associated with a bank (a, b, c, or d), respectively, nearest thereto.

The process for determining the route points illustrated with reference to FIGS. 3A to 3D is exemplary. Other algorithms may be used to associate each route point of the preset driving route with a POI on the basis of a distance association.

Figure 4:
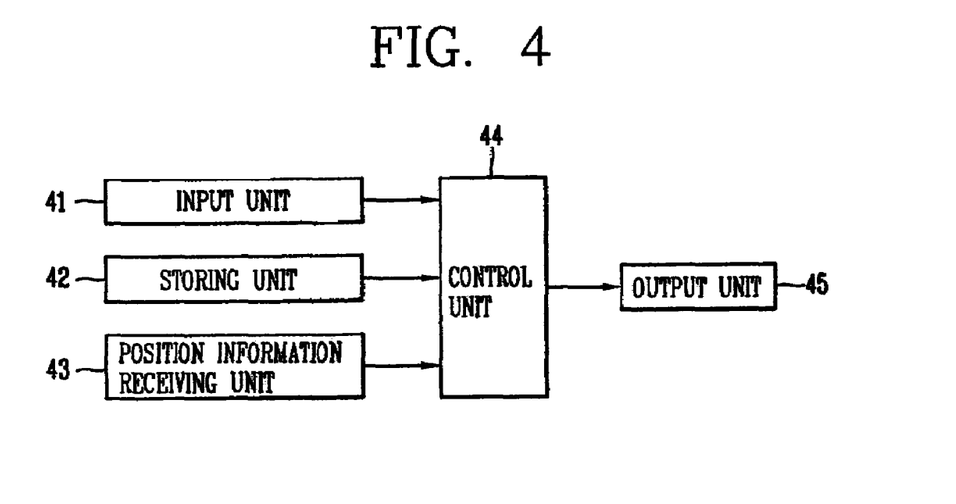
FIG. 4 illustrates a navigation apparatus.

FIG. 4 illustrates a navigation apparatus that includes an input unit 41 for enabling input of particular information; a storing unit 42 for storing particular data; a position information receiving unit 43 for receiving position information for a moving object; a control unit 44 for controlling an overall operation of the navigation apparatus; and an output unit 45 for outputting various information.

The input unit 41 is a user interface configured to permit a user to input information to the navigation apparatus. The input unit 41 may include, for example, a key input unit (e.g., a keyboard) and a touch screen input unit (e.g., a touch sensitive plasma screen). The input unit 41 is configured to enable the user to specify or otherwise input a preset driving route by, for example, inputting a desintation point and optionally a start point. The input unit 41 also enables the user to request a POI search by, for example, enabling the user to input one or more search words or search terms. The input unit 41 optionally may also enable the user to select or otherwise designate one or more of the searched POIs as part of a request to receive route guidance information thereto or other information associated therewith. The selected/designated POIs may optionally be previously searched POIs.

The storing unit 42 is one or more data stores configured to store a map database, a POI database, and a matching POI database. In one implementation, the storing unit 42 includes one data store or memory configured to store the map database and another data store or memory configured to store the POI database and the matching POI database. The map database may be stored, for example in a Compact Disk-Read Only Memory (CD-ROM). The POI database may include any information associated with POIs and the matching POI database may include matching data that associates selected or identified POIs with route points on a preset driving route. The selected or identified POIs may have been selected or identified in response to a previously submitted search request. In another implementation, the storing unit 42 may include a single memory or data store for storing both the POI and the map databases.

The position information receiving unit 43 is configured to receive a GPS signal including position information for a moving object. The unit 43 may additionally be configured to receive a self sensor signal from, for example a velocity sensor or a gyro sensor, that also includes position information for the moving object. In another implementation, the position information receiving unit 43 may include the velocity sensor or the gyro sensor.

The control unit 44 controls an overall operation of the navigation apparatus. The control unit 44 operation includes accessing the map database stored in the storing unit 42 to enable identification of a preset driving route between a specified destination point and a start point. The start point may be calculated automatically by the navigation apparatus.

The control unit 44 receives a search request submitted by a user from the input unit 41 and searches the POI database for POIs having position coordinates adjacent to the preset driving route based on the search request (e.g., based on the search terms). The control unit 44 determines a current position of the moving object based on position information received from the position information receiving unit 43.

The control unit 44 also is configured to pre-associate each route point on the preset driving route with a searched POI, preferably, on the basis of a distance association. More preferably, the control unit 44 may associate each route point on the preset driving route with the POI nearest thereto. The detailed operation of the control unit 44 was described previously in reference to FIGS. 2 and 3A to 3D.

The output unit 45 is configured to output information for the POI associated with the route point corresponding to the current position of the moving object in real time under the control of the control unit 44. The detailed operation of the output unit 45 was described previously in reference to FIGS. 2 and 3A to 3D.

Figure 5:
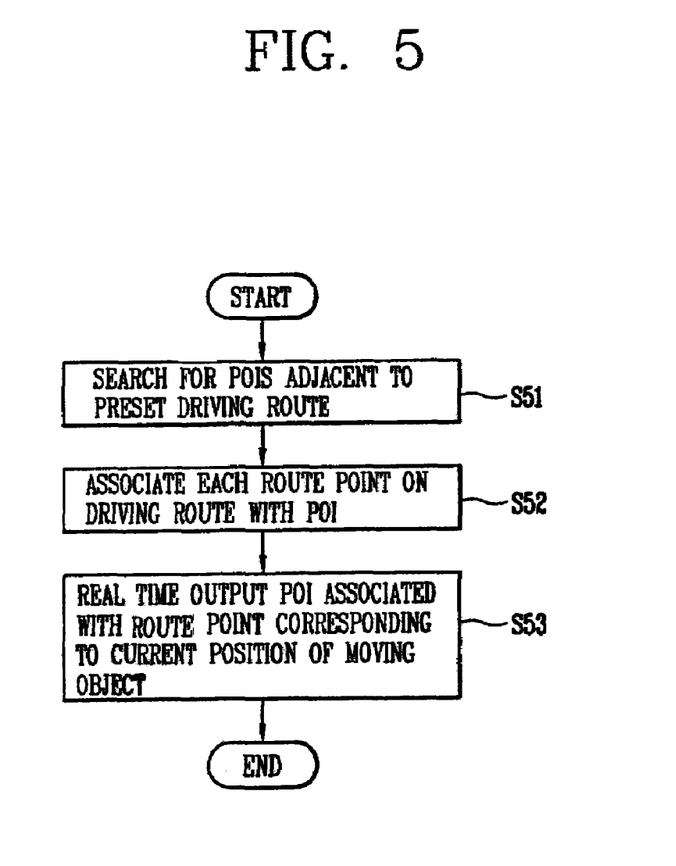
FIG. 5 is a flowchart illustrating a method for searching for POIs using a navigation apparatus.

FIG. 5 is a flowchart illustrating a method for searching for a POI in a navigation apparatus.

The navigation apparatus searches for POIs adjacent to a preset driving route (S51) and pre-associates each route point on the preset driving route with a respective POI (S52). The navigation apparatus outputs in real time information for the POI previously associated with the route point where a moving object is currently positioned (S53).

Referring to operation S51, the navigation apparatus enables a user to specify a preset driving route by, for example, enabling the user to input a start point S and a destination point E. The navigation apparatus enables the user to request a search for POIs by, for example, enabling the user to input one or more search words or terms. Thus, the navigation apparatus accesses a map database to determine an optimal preset driving route between the start point S and the destination point E and identifies POIs around the optimal driving route.

The navigation apparatus may identify POI around the preset driving route by, for example, searching the POI database (DB) for POI data that include one or more words that are identical (or similar) to the inputted search word(s)/term(s) and that include a position coordinate within a predetermined distance from the preset driving route.

Referring to operation S52, once the POIs around the preset driving route have been identified, the navigation apparatus associates each point on the preset driving route with a respective POI. Each POI and each route point may be associated with each other on the basis of a distance association. For example, each route point may be associated with the POI nearest thereto. Associating each route point on the preset driving route with a POI may include determining boundary points on the preset driving routes. The process by which boundary points are determined was described previously with respect to FIGS. 2 and 3A to 3D. The information that relates the route points and their respective POIs may be stored in the storing unit of the navigation apparatus.

After each route point on the preset driving route has been identified with or associated with a respective POI and the association has been stored, the navigation apparatus is able to dynamically provide a user with POI information as the moving object moves along the driving route. Referring to operation S53, the route point at which the moving object is currently positioned is determined, the POI associated with that route point is accessed, and information related to the accessed POI is outputted in real time to the user (S53). The operation of the output unit 45 was described previously with respect to FIGS. 2 and 3A to 3D.

As described above, each route point on the preset driving route is pre-associated with a respective searched POI. Such pre-association enables the navigation apparatus to avoid the need to perform a new POI search each time the moving object moves. Instead, the navigation apparatus simply determines the current position of the moving object, determines the corresponding route point on the preset driving route, accesses the previously searched POI associated with that route point, and accesses and presents/outputs information associated with that POI to the user in real time.

Other implementations are within the scope of the following claims.

What is claimed is:

1. A navigation apparatus comprising:
   a control unit configured to:
      access a preset driving route including a group of consecutive route points that begin at a start route point and end at a destination route point,
      for each route point in the group of consecutive route points, identify a POI that is nearest to the route point and store the identified POI in association with the route point in a first storing unit,
      determine a current position of a moving object,
      after storing the identified POIs, select a current route point corresponding to the current position from among the group of route points,
      select, based on the current route point, the POI stored in the first storing unit that was identified as being nearest to the current route point, and
      access information associated with the POI identified as being nearest to the current route point;
   the first storing unit configured to store the identified POIs, and
   an output unit configured to output the accessed information associated with the POI identified as being nearest to the current route point.

2. The apparatus of claim 1, wherein the output unit being configured to output the information comprises the output unit being configured to enable a user to perceive the information associated with the POI identified as being nearest to the current route point.

3. The apparatus of claim 1, wherein the control unit is configured to determine the current position of the moving object by:
   accessing position information for the moving object, and
   determining the current position based on the position information.

4. The apparatus of claim 1, further comprising:
   a second storing unit configured to store a map database; and
   a first input unit configured to enable an entity to input a destination point corresponding to the destination route point and a start point corresponding to the start route point,
   wherein the control unit is further configured to select the preset driving route from among a plurality of driving routes between the start point and the destination point based on information stored in the map database.

5. The apparatus of claim 1, further comprising:
   a second storing unit configured to store a POI database; and
   a first input unit configured to enable a user to input at least one search term for searching POIs,
   wherein the control unit being configured to associate the POIs with each route point on the preset driving route includes the control unit being configured to search the POI database based on the at least one search term.

6. The apparatus of claim I, further comprising:
   a position information receiving unit configured to receive position information associated with the moving object, wherein the control unit is configured to determine the current position of the moving object based on the position information received by the position information receiving unit.

7. The apparatus of claim 1, further comprising a second storing unit configured to store data that associates each identified POI with each route point in the group.

8. The apparatus of claim 1, wherein the control unit is additionally configured to identify one of the route points in the group of route points as a boundary point,
wherein the boundary point is a point on the preset driving route having a characteristic that a route point of the preset driving route that is positioned immediately before the boundary point has a POI nearest thereto that is different from a POI nearest to a route point of the preset driving route that is positioned immediately after the boundary point.

9. The apparatus of claim 8, further comprising:
a first input unit configured to enable a user to input a destination point corresponding to the destination route point and a start point corresponding to the start route point,
wherein the control unit is further configured to select the preset driving route from among a plurality of driving routes between the start point and the destination point inputted by the user, and
wherein the control unit being configured to identify, for each route point in the group of route points, a POI nearest to the route point comprises the control unit being configured to:
identify boundary points along the preset driving route, each of the boundary points being a point on the driving route having a characteristic that a route point of the preset driving route positioned immediately before the boundary point has a POI nearest thereto that is different from a POI nearest to a route point of the preset driving route that is positioned immediately after the boundary point,
divide the preset driving route into a plurality of route sections using the boundary points, each of the route sections consisting of a subset of consecutive route points of the preset driving route that is either positioned between two boundary points, positioned between the start route point and a boundary point, or positioned between a boundary point and the destination route point,
determine, for each route section, a POI nearest thereto, and
for each route point in each route section, identify the POI nearest to the route point as being the POI determined to be nearest to the route section that includes the route point.

10. The apparatus of claim 8, wherein the output unit, under control of the control unit, is configured to output information related to a change from the POI associated with the route point positioned immediately before the boundary point to the POI associated with the route point positioned immediately after the boundary point,
wherein the information relating to the change is output when the current route point is the determined boundary point, and
wherein the information comprises audio data, text, or image data.

11. The apparatus of claim 1, wherein the output unit is configured to output audio data, text, or image data.

12. The apparatus of claim 1, wherein the output unit, under control of the control unit, is configured to output distance information from the current position of the moving object to a location of the POI identified as being nearest to the current route point.

13. The apparatus of claim 1, further comprising:
an input unit configured to enable a user to select a POI from among the identified POIs,
wherein the output unit, under control of the control unit, is further configured to output information associated with the user-selected POI.

14. The apparatus of claim 13, wherein the user-selected POI is a POI other than the POI identified as being nearest to the current route point.

15. The apparatus of claim 13, wherein the output unit, under control of the control unit, is further configured to output route guidance information from the current position of the moving object to the user-selected POI.

16. A method for searching for a Point of Interest (POI) in a navigation apparatus, the method including:
accessing a preset driving route including a group of consecutive route points that begin at a start route point and end at a destination route point,
for each route point in the group of consecutive route points, identifying a POI that is nearest to the route point and storing the identified POI in association with the route point in a first storing unit,
determining a current position of a moving object,
after storing the identified POIs, selecting a current route point corresponding to the current position from among the group of route points,
selecting, based on the current route point the POI stored in the first storing unit that was identified as being nearest to the current route point, and
accessing information associated with the POI identified as being nearest to the current route point; and
outputting the accessed information associated with the POI identified as being nearest to the current route point.

17. The method of claim 16, wherein outputting the information comprises enabling a user to perceive the information associated with the POI identified as being nearest to the current route point.

18. The method of claim 16, wherein the start route point and the destination route point were inputted by a user of the navigation apparatus to request driving instructions.

19. The method of claim 16, wherein identifying a POI that is nearest to each route point includes searching a POI database based on at least one search term inputted by a user.

20. The method of claim 16, further comprising identifying one of the route points in the group of route points as a boundary point,
wherein the boundary point is a point on the preset driving route having a characteristic that a route point of the preset driving route that is positioned immediately before the boundary point has a POI nearest thereto that is different from a POI nearest to a route point of the preset driving route that is positioned immediately after the boundary point.

21. The method of claim 20, further comprising:
enabling a user to input a destination point corresponding to the destination route point and a start point corresponding to the start route point, and
selecting the preset driving route from among a plurality of driving routes between the start point and the destination point inputted by the user,
wherein identifying, for each route point in the group of route points, a POI nearest to the route point comprises:
identifying boundary points along the preset driving route, each of the boundary points being a point on the driving route having a characteristic that a route point of the preset driving route positioned immediately before the boundary point has a POI nearest thereto that is different from a POI nearest to a route point of the preset driving route that is positioned immediately after the boundary point, dividing the preset driving route into a plurality of route sections using the boundary points, each of the route sections consisting of a subset of consecutive route points of the preset driving route that is either positioned between two boundary points, positioned between the start route point and a boundary point, or positioned between a boundary point and the destination route point, determining, for each route section. a POI nearest thereto, and for each route point in each route section, identifying the POI nearest to the route point as being the POI determined to be nearest to the route section that includes the route point.

22. The method of claim 20, wherein outputting information includes outputting information related to a change from the POI associated with the route point positioned immediately before the boundary point to the POI associated with the route point positioned immediately after the boundary point,
wherein the information relating to the change is output when the current route point is the determined boundary point, and
wherein the information comprises audio data, text, or image data.

23. The method of claim 16, wherein outputting information includes outputting audio data, text, or image data.

24. The method of claim 16, wherein the outputting information includes outputting distance information from the current position of the moving object to a location of the POI identified as being nearest to the current route point.

25. The method of claim 16, further comprising:
enabling a user to select a POI from among the identified POIs,
wherein outputting information includes outputting information associated with the user-selected POI.

26. The method of claim 25, wherein the user-selected POI is a POI other than the POI identified as being nearest to the current route point.

27. The apparatus of claim 25, wherein outputting the information includes outputting route guidance information from the current position of the moving object to the user-selected POI.

28. An apparatus for searching for a Point of Interest (POI) in a navigation apparatus, the apparatus including:
means for accessing a preset driving route including a group of consecutive route points that begin at a start route point and end at a destination route point,
means for identifying, for each route point in the group of consecutive route points, a POI that is nearest to the route point and storing the identified POI in association with the route point in a first storing unit,
means for determining a current position of a moving object,
means for selecting a current route point corresponding to the current position from among the group of route points after storing the identified POIs,
means for selecting, based on the current route point, the POI stored in the first storing unit that was identified as being nearest to the current route point, and
means for accessing information associated wit the POI identified as being nearest to the current route point; and
means for outputting the accessed information associated with the POI identified as being nearest to current route point.

* * * * *